United States Patent [19]

Rutherford, Sr.

[11] Patent Number: 5,794,861
[45] Date of Patent: Aug. 18, 1998

[54] PROCESS AND APPARATUS FOR SEPARATING COMPONENTS OF FRAGMENTED VEHICLE TIRES

[75] Inventor: Darrel Rutherford, Sr., Trenton, Ohio

[73] Assignee: D & R Recyclers, Inc., Hamilton, Ohio

[21] Appl. No.: 587,480

[22] Filed: Jan. 17, 1996

Related U.S. Application Data

[60] Provisional application No. 60/004,840, Oct. 5, 1995.
[51] Int. Cl.⁶ .................................................. B02C 19/00
[52] U.S. Cl. .................. 241/1; 241/21; 241/41; 241/79.1; 241/DIG. 31
[58] Field of Search ......................... 241/1, 15, 21, 241/DIG. 31, 39, 41, 79.1, 186.35, 186.4

[56] References Cited

U.S. PATENT DOCUMENTS

| | | | |
|---|---|---|---|
| 4,813,614 | 3/1989 | Moore et al. | 241/23 |
| 5,115,983 | 5/1992 | Rutherford, Sr. | 241/1 |
| 5,122,047 | 6/1992 | Bauckhage et al. | 241/1 X |
| 5,323,969 | 6/1994 | Mendenhall et al. | 241/1 |
| 5,482,215 | 1/1996 | Veres | 241/1 |

FOREIGN PATENT DOCUMENTS

1172592  8/1985  U.S.S.R. .................... 241/1

Primary Examiner—John M. Husar
Attorney, Agent, or Firm—Porter, Wright, Morris & Arthur

[57] ABSTRACT

Methods and equipment are described for the recycling of pieces of pre-fragmented scrap tires using high pressure water jets. The use of high pressure water provides for the production of fragmented rubber material in useful sizes and also provides for a separation of the fragmented rubber from the cording and bead material of the pieces of pre-fragmented tires. Recovery of metal cording material in a form suitable for reuse is also one feature of the present invention.

27 Claims, 2 Drawing Sheets

Fig_1

FIG_2.

5,794,861

PROCESS AND APPARATUS FOR SEPARATING COMPONENTS OF FRAGMENTED VEHICLE TIRES

RELATED APPLICATION

This application is based upon provisional application Ser. No. 60/004,840, filed on Oct. 5, 1995 in accordance with 35 U.S.C. § 111 (b), having the same title and inventor as the present application, and claims right of priority therefrom in accordance with 35 U.S.C § 119 (e).

FIELD OF INVENTION

This invention relates generally to the field of recycling solid waste materials, and more particularly to processes and equipment for the separation, recycling, and reclamation of useful materials from fragmented rubber vehicle tires by means of high pressure fluid, typically water.

BACKGROUND OF INVENTION

The disposal of rubber vehicle tires from automobiles, tractors, trucks, etc. is a serious problem in the modern automotive economy. While some tires are suitable for retreading, many are too badly worn, cut, punctured or otherwise damaged for economical retreading; or the quality of retreaded tires is not acceptable to many consumers. Therefore, the disposal or recycling of scrap tires becomes a major concern.

Tires typically consist of a reinforcing cord (often steel cord in mode "steel belted" tires), woven typically into a mat or belt, and circumferentially surrounding the tire beneath the road-contacting surface of the tread. A primary purpose of this belt is to strengthen the tire against damage from puncture or impact with holes or road debris. Modern steel cording material is typically a rather high quality steel. Tires also generally contain several heavy metal bands or wires imbedded in the rubber for support on the inner circumference of the tire, where the tire contacts the rim of the wheel. This "bead" is typically a very strong and heavy steel that is difficult to cut in many mechanical tire fragmenting machines and causes excessive wear on the cutting tools of such equipment.

In addition to the metal cording material and bead, tires also typically consist of several layers of synthetic or naturally-occurring products arranged into tread, various other plies, sidewalls, inner lining, etc. The precise composition and configuration will generally vary considerably, depending on the type of tire, its intended use and service life, desired market price, and consumer preferences. Such "rubber-like" materials may have a variety of different chemical compositions and be arranged in differing physical configurations for each tire type, manufacturer, etc. For convenience, we will use the term "rubber" to denote all such rubber-like materials comprising tires.

Additional support and cohesion is introduced into many tires by using a fabric cord (typically nylon or rayon) imbedded in the rubber and typically located in regions of the tire not contacting the road. Thus, for purposes of this description, we identify four components of typical tires: 1) metal cording material, typically steel in steel belted tires; 2) metal bead, typically steel; 3) fabric (or non-metallic) cording material; and 4) rubber. However, the present invention relates to the use of high pressure fluid to detach and/or remove the rubber/fabric from the steel cord/bead. For economy of language we will frequently use the term "rubber" to indicate materials typically detached from the steel cord/bead during high pressure processing whether in the form of rubber or fabric materials, understanding thereby that the majority of such material will be rubber or rubber-like, but containing a portion of fabric. Similarly, we will use the term "steel", "metal", "steel cord", or "metal cord" as shorthand to indicate the material comprising the woven metal underlying the tread, as commonly used in the manufacture of steel belted radial tires, or the steel bands contained in the bead of the tire. We anticipate no confusion from such usages since the typical "rubber" (or fabric) tire constituents generally behave quite similarly in the practice of the present invention, while steel cord or bead also require similar treatment in the practice of the present invention. Specific distinctions will be made when necessary.

Rubber and fabric cord can typically be burned as tire derived fuel or used in other tire derived products (occasionally following further separation and/or processing). The metal cording material and bead will normally have some value as scrap metal if it is separated in a reasonably clean state. A method for effecting such a separation is among the primary purposes of the present invention.

The essential function of a tire is to give rugged, long-lifetime service at high-speeds over rough or debris-laden roadways. This necessitates a very tough tire of rugged construction in order to meet consumer demands. Thus, acceptable tires in service invariably present a challenging disposal problem due to the very toughness which makes the tire an acceptable purchase for the consumer.

Faced with these inherent difficulties of tire disposal, much consideration is naturally given to recycling scrap tires for the extraction of as much useful material as possible. Finely shredded rubber from scrap tires (often called "granulite" or "crumb rubber") has been used as a fuel source commonly known as "tire derived fuel." Such fuel has been used as an energy source in the generation of electricity, in the production of paper and cement, and in various other industries. Apparently, burning of suitably fragmented tires can be performed in an environmentally safe manner if proper precautions are taken. Recycled rubber from tires is also used as a component of various products commonly known as "tire derived products." Such products include asphalt paving mixtures and as extenders in a variety of rubber products such as roofing materials, walk pads, carpet and flooring underlay, concrete and other products. More such products are being demonstrated as time passes.

While the smoke and noxious chemicals generated by uncontrolled incineration of scrap tires are clearly no longer acceptable for release into the environment, considerable activity related to the development of alternative methods of disposal/recycling has occurred, including; various methods of chemical decomposition (U.S. Pat. Nos. 5,438,078; 5,418,256; 5,304,576; 5,364,996; 5,157,176), pyrolytic disposal (U.S. Pat. Nos. 5,438,029; 5,435,890; 5,236,352; 5,229,099; 5,208,401; 5,101,739; 5,099,086; 5,087,436), cryogenic disposal (U.S. Pat. No. 5,385,307), partial incineration (U.S. Pat. No. 5,452,670) or controlled incineration (U.S. Pat. Nos. 5,452,670; 5,101,742), to cite a few recent examples. The number of such recent patents related to tire disposal and recycling is clear testimony to the importance of finding a solution for this challenging and environmentally significant problem.

An alternative to disposal by incineration has heretofore been to landfill scrap tires, either as whole tires or following some form of mechanical fragmenting (also commonly denoted as "shredding") in a pre-processing step. However, continued burial of tires in landfills is becoming increasingly difficult as landfills are closed and acceptable sites for new landfills become harder to locate. This is generally true for tires either in the form of whole tires or following some form of fragmenting or other pre-processing. Whole tire disposal in landfills is typically more difficult than the landfill disposal of fragmented tires, which in some locations are still legally finding their way into landfills. Despite increasing concern over what to do with the fragmented pieces, mechanical fragmenting of tires into smaller pieces is a common method of tire processing presently in widespread use. Such mechanical fragmenting decreases the amount of space required for disposal in landfills (tire for tire), but does not enable one to recycle and reclaim materials from the tires without further processing. Nevertheless, mechanical processing of scrap tires in the form of cutting, fragmenting, shredding, compacting, etc. continues to be an active field of endeavor (U. S. Pat. Nos. 5,199,337; 5,267,496; 5,347,919; 5,299,744; 5,375,775; 5,395,061; 5,411,216). It is often the case that mechanical shredding or fragmenting of scrap tires is merely the first step in a complex series of steps whose ultimate goal is the final disposal of tires, perhaps with the retrieval of some economically beneficial materials therefrom. The use of high pressure fluid, typically water, as a subsequent processing step following the mechanical fragmenting of scrap tires, is a basic approach of the present invention, and not heretofore used as a means for the ultimate recycling and reclamation of useful materials from mechanically fragmented scrap tires.

Mechanical fragmentation is the typical method for tire recycling in use today. However, such mechanical fragmenting typically does not separate the metal cording or bead material from the rubber of the fragmented tire. Therefore, the fragmented rubber is rendered useless for many additional purposes. The economic value of the scrap steel is effectively lost. Following combustion of the rubber/steel, the surface of the steel is typically too encrusted with ash and combustion by-products to make separation and recovery of the scrap metal economically worthwhile.

In addition, typical mechanical fragmenting operations produce particles of scrap rubber generally too large for convenient use as a fuel or as an additive in asphalt paving. Further processing, adding to the costs, would be required to derive economic benefit from reuse of such component materials (although the patent of B. H. Granite U.S. Pat. No. 4,015,782 addresses this problem).

Wear on mechanical fragmenting devices is typically a serious expense and maintenance difficulty. For this reason larger tires, such as truck or tractor tires, are typically not recycled. Also, even for passenger car tires, the heavy steel bead can often produce unacceptable wear on mechanical cutting devices. It is often recommended that tires be "debeaded" before fragmenting (i.e., physically cut and remove the bead and immediately surrounding rubber from the rest of the tire). Clearly, such debeading adds to the cost of tire recycling and leaves the bead and attached rubber requiring disposal.

Efforts to ease such problems of mechanical fragmenting by cutters have included the use of cryogenic fluids (such as liquid nitrogen) to crystallize tires into brittle matter, allowing fragmentation by mechanical crushing (U.S. Pat. No. 4,813,614), rather than using cutting devices.

Apparently separate from this important need to recycle scrap vehicle tires, developments in the use of high pressure fluids (typically water) were underway. High pressure water has been used to clean a variety of products (U.S. Pat. No. 4,433,698; 5,220,935), including grass (U.S. Pat. No. 5,454,190), and in transportable embodiments for mobile operation (U.S. Pat. No. 3,685,535; 4,112,535; 4,219,155; 4,337,784). High pressure water is also commonly used to cut or fragment a variety of materials (U.S. Pat. No. 4,761,039; 4,776,769; 4,795,217). Such uses have included fragmenting meat or food products (U.S. Pat. No. 3,722,032; 5,243,886), spark-free cutting processes (U.S. Pat. No. 4,986,479), asbestos removal (U.S. Pat. No. 4,897,121), and the fragmenting of asphalt (U.S. Pat. No. 4,560,207) or concrete (U.S. Pat. No. 4,753,549). The union of these disparate lines of development—high pressure water technology with scrap tire processing—resulting in improved processes for the recovery of usable material from scrap tires, is a fundamental thrust of the present invention.

Previous patents by the present inventor (U.S. Pat. Nos. 5,115,983 and 5,341,996) have described the use of high pressure fluids in the process of recycling vehicle tires, and a specific apparatus in which such a process might be carried out. However, the present invention realizes significant advantages in the use of high pressure water to recycle tires which have previously undergone fragmentation, typically by means of a mechanical tire cutting device. One of these advantages is that the process of the present invention can continuously process and recycle the pieces of pre-fragmented tires (rather than tire-by-tire batch processing) because the relatively small pieces of pre-fragmented tires are easier to handle in a continuous conveyer, rotary or analogous process than are whole tires. This process of recycling pieces of pre-fragmented tires is potentially of great economic importance in so far as numerous mechanical tire cutting machines are currently in service, producing fragmented pieces of tires which require disposal. Fragmented tire pieces are presently typically buried in landfills or incinerated. Landfill disposal is not expected to be an indefinite solution for pieces of fragmented tires, just has whole tires have generally already been banned from landfills. Incineration extracts the energy content of the fuel in the tire, but is typically not the most valuable use for crumb rubber or scrap steel if these components can be separated without destruction of their respective economic values. Such separation is an object of the present invention.

It is common in the field to refer to mechanical fragmentation of tires as "shredding". However, the tire pieces resulting from such mechanical fragmentation are typically too large for direct use in tire derived products. Therefore, further "shredding" must be carried out in order to obtain finer powders of crumb rubber or granulite in order to realize the increased economic value from such uses. Herein, we will generally refer to mechanical cutting of tires into pieces as mechanical "fragmentation" to distinguish from processes resulting in finer, more useful grades of crumb rubber, although the common usage of "shred" is also occasionally noted. Subsequent processing of these pre-fragmented pieces to separate reusable steel and crumb rubber is among the goals of the present invention.

The use of high pressure water to separate the steel from the rubber is typically a much faster process for pre-fragmented tires than when employed in the reduction of whole tires. Therefore, processing speeds for the water separation step are increased significantly when used on pre-fragmented tires. Also, when dealing with pieces of pre-fragmented tires, the geometry of a whole, substantially intact, tire is no longer a complicating factor in the design of the process and the equipment in which to carry out the process. Engineering of tire recycling systems to direct high pressure water onto all portions of a substantially intact tire in order effectively to separate the rubber from the steel has proven to be bothersome. Separating the rubber and steel components of pre-fragmented tires by means of high pressure water avoids these geometric and engineering complications.

The basic approach of the present invention is to direct high pressure water onto the pieces of pre-fragmented tires in such a way as to strip the rubber from the metal cording material. The metal cording material will typically have been mechanically cut and reside within the fragmented tire pieces along with the rubber, and both delivered into the present process in various sized pieces of rubber and metal cording material. One object of the present process is to separate the rubber from the metal cording material. In other words, whatever bonds, forces or encapsulation occurring between the metal cording material and the rubber of the pieces of pre-fragmented tires will essentially be broken when subject to the high pressure processing of the present invention. However, in typical operation of the present process, the metal cording material will be present in fragments which will flow along with the fragmented rubber into the effluent water stream, but essentially detached from the rubber as a simple mixture. Thus, the present process will generally (but not always) produce a mix of fragmented ("crumb") rubber and fragments of detached metal cording material. A full separation of steel and rubber would be effected (if necessary) by a process following the high pressure process described herein. Typically, a magnetic separation of steel from rubber would be carried out, perhaps following drying of the mixture by suitable furnace, oven, lamps, radiation, convection or other drying means. While magnetic separation is expected to be the preferred procedure for separating steel from rubber fragments, other methods, such as sieving, pyrolysis, flotation, centrifugation and the like, are not thereby excluded.

The present invention should be contrasted with that of Tugov (USSR Patent 213,339) in which thin streams of a temperature-controlled liquid are directed under pressure onto a combination of polymer (rubber) and a fabric or thread cord. Thin streams of liquid under pressure are often used to cut materials (even steel or concrete), apparently accomplished also by Tugov. The control of temperature is apparently intended to avoid damage to the polymer or fabric. The present invention requires no temperature control and specifically avoids using thin streams of liquid in order to achieve effective detachment and debonding of the rubber from the steel.

For the common case in which pre-fragmented tires have been separated from the bead, it would be a simple modification of the present invention to use high pressure water to separate the rubber from the steel of the bead in a separate processing step, or in entirely separate processing equipment. The present discussion will tend to place emphasis on separation of rubber from steel of the steel belts as that is expected to be the more challenging step. It is not intended thereby to exclude the separation of rubber from the tire beads. High pressure water directed onto previously "debeaded" portions of tires (the bead and surrounding region of rubber) will effect debonding and detachment of rubber from steel in a manner very similar to the detachment of rubber from the woven structure of typical steel belts.

While very high pressure water, focused into a thin stream, can cut essentially any material, even the bead of tires, it is not envisioned that destruction of the tire bead will be a preferred method for practice of the present invention. The bead of tires is typically in the form of relatively smooth bands or thick wires, in contrast to the woven mat structure of typical steel belts. In practice, the steel belts are much more susceptible to entanglement with the processing equipment than are the beads. Therefore, to avoid this difficulty, it may prove beneficial for water to be directed onto all portions of pre-fragmented, or intact, tires until the rubber and steel belt materials are both reduced to fragments and delivered into the effluent stream as a debonded simple mixture for later magnetic or other separation. Therefore, an alternative embodiment of the present invention would be to use the high pressure fluid itself as a pre-fragmenting means, replacing mechanical fragmentation as the means to fragment the woven steel of the steel belts into pieces for later separation from the detached and debonded rubber by magnetic or other means. However, the bead of tires is not readily susceptible to such water fragmentation. But as smooth, separate, and relatively thick single-stranded wires (not typically having woven structures), the wires comprising the bead are not subject to entanglement with the equipment to nearly the extent as substantially intact steel belts. Therefore, a process in which high pressure water fragments both rubber and steel belts (while detaching the rubber from the steel) would significantly simplify the task of extracting the remaining bead material from the processing equipment, while leaving the rubber and fragmented steel belt as a simple mixture in the effluent fluid stream for later separation as described generally herein.

SUMMARY OF THE INVENTION

The present invention describes processes and equipment whereby high pressure fluid, typically water, or water containing additives, is directed onto substantially all fragmented portions of pre-fragmented rubber tires in order to detach or debond the rubber components thereof from the metal cord or bead. The use of high pressure water directed onto pre-fragmented tires permits a much higher processing speed to be utilized than is feasible for high pressure water processing of substantially intact tires. In addition, directing high pressure water onto pre-fragmented tires is amenable to continuous processing in conveyor, rotary or similar mode much more readily than such continuous processing could be accomplished for intact tires, increasing further thereby the speed of high pressure water processing for pre-fragmented tires. An alternative embodiment uses high pressure water to detach and fragment rubber and steel belt material simultaneously with detaching and debonding the rubber from the steel. The detached steel and rubber components of such tire fragments may be separated, in a single step simultaneously with high pressure processing, or may remain together as a simple mixture for later separation by magnetic or other means.

OBJECTS OF THE INVENTION

A primary object of the present invention is to provide a high pressure water process for detaching the rubber from the metal components within pieces of pre-fragmented tires.

Another object of the present invention is to provide a high pressure water process for recovering rubber and metal components from pieces of pre-fragmented tires.

Another object of the present invention is to recycle pieces of pre-fragmented tires thereby producing fragmented rubber in sizes sufficiently small to use subsequently as tire derived fuel or in tire derived products.

Another object of the present invention is to recycle pieces of pre-fragmented tires to separate the rubber from the cording and bead material of said pieces of pre-fragmented tires.

Yet another object of the present invention is to separate the metal cording material from the rubber of pieces of pre-fragmented tires.

Yet another object of the present invention is to recycle pieces of pre-fragmented rubber tires in which substantial additional fragmentation of metal cording material in said pre-fragmented pieces does not occur.

Yet another object of the present invention is to accomplish by means of high pressure water separation of rubber from the metal cording material and bead of pieces of pre-fragmented tires, in which the effluent water stream contains certain amounts of fragmented metal cording material or bead.

Another object of the present invention is to fragment rubber and woven steel belts of pre-fragmented or intact tires simultaneously with detaching the rubber from the steel thereof.

Another object of the present invention is to reclaim metal from fragments of pre-fragmented scrap tires in reusable form, lacking significant surface contamination of the metal.

Another object of the present invention is to produce different qualities of crumb rubber from pieces of pre-fragmented tires by using a multi-stage high pressure water recycling process.

DETAILED DESCRIPTION OF PREFERRED EMBODIMENTS

The present invention relates to the use of high pressure fluid, typically water, for the separation of rubber and fabric from the metal cording and bead material of pieces of pre-fragmented scrap tires. Other fluids are expected to function essentially equivalently in stripping rubber from tires when applied under pressure as obvious alternative embodiments. However, hereinafter we simply use the term "water" for economy of language to indicate any such fluid, and to reflect our assessment that water will be the typical fluid of choice. The basic approach is to direct high pressure water onto the pieces of pre-fragmented tire in such a way as to completely strip the rubber from the metal cording material and bead (if present). In one embodiment, the rubber and fabric cord is typically washed away with the effluent water, leaving the metal cording material or bead behind. Thus, a natural separation of crumb rubber from the metal tire components is accomplished without the need for additional separation of shredded materials from the downstream effluent water. The region in which high pressure water is directed onto the target we call the "processing zone" in order to distinguish it from the effluent stream which may contain steel and rubber as well as the effluent water.

Frequently, the woven steel belt of typical steel belted tires is prone to entanglement with the processing equipment. Therefore, in another embodiment of the present invention, the high pressure water is directed onto the tire pieces with such intensity, duration, and volume as to effect a detachment and debonding of the rubber from the steel, and wash both rubber and steel into the effluent stream. Fragmenting of the steel cord is more difficult in certain brands of tires than in others, apparently depending upon the structure of the steel and the weave employed by the particular manufacturer. In the practice of the present invention, the steel cord may not be physically fragmented, but may be "dewoven" in the high pressure processing zone by the churning action of the high pressure water impinging on tire pieces within the processing zone. Such dewoven steel may have the form of relatively small fragments of steel, easily washed out of the processing zone along with the fragmented rubber and effluent water. However, it is not excluded in the practice of the present invention that high pressure water will physically fragment the steel into smaller fragments and wash such fragments into the effluent stream. Even for those tires in which a tightly woven steel cording material is present (such that significant deweaving does not occur under typical processing conditions within the high pressure processing zone), high pressure processing can still be used in a more extreme fashion: 1) to strip substantially all rubber from the steel within the processing zone, and 2) force the substantially clean steel out of the processing zone along with the effluent water and fragmented rubber. The steel may or may not undergo physical fragmentation in the processing zone, so long as conditions permit detachment of the rubber therefrom and the exit of both from the processing zone along with the effluent water. As detached components of a simple mixture, the rubber and steel are readily separated (perhaps following drying) by a magnetic separation procedure, well known in the separation of magnetic from non-magnetic materials. As noted above, magnetic separation is expected to be the preferred procedure for separating steel from rubber fragments, but other methods, such as sieving, pyrolysis, flotation, centrifugation and the like, are not thereby excluded.

Yet another embodiment of the present invention is to use the high pressure processing zone to decompose an entire, substantially intact tire, washing crumb rubber and steel cording material into the effluent water stream while leaving the substantially clean, substantially smooth bead behind in the processing zone. Rather than incur the expense and time of a mechanical pre-fragmentation step, the high pressure water present in the processing zone is itself used to pre-fragment an entire tire. This approach to whole tire processing has the disadvantage of requiring tire-by-tire processing, negating some of the advantages of continuous processing of pre-fragmented tire pieces. However certain advantages are also obtained. The bead of typical tires is not generally prone to entanglement with processing equipment, unlike the woven steel belts commonly contained in modern tires. Therefore, when decomposing whole tires as described herein, the problem of removal of the scrap steel from the processing zone concerns only the smooth wires of the bead. In addition, deweaving, fragmenting and washing the steel of the steel belts into the effluent stream is an explicit goal of this process. Therefore, sophisticated engineering is not necessarily required for the purpose of directing proper amounts and pressures of high pressure water onto all regions of a substantially intact tire at appropriate angles and for appropriate durations. "Brute force" processing becomes a possibility, using sufficient pressure, volume and duration of high pressure water to detach and decompose rubber and steel belts, fragmenting and washing everything except the bead into the effluent water stream. The problem thus becomes one of an economic tradeoff, comparing: 1) the costs of producing and delivering sufficient water pressures and volumes, for sufficient times, to decompose an entire tire (except for the bead) and the additional expense of later separation of the component materials; versus, 2) the engineering complications of directing high pressure water relatively carefully onto all portions of a substantially intact tire to strip the rubber therefrom while not causing significant steel to leave the processing zone, and the subsequent removal of the (typically woven, frequently tangled) steel belt from the processing equipment. Such economic considerations are not carefully evaluated within the scope of the present description, and all such embodiments are intended to be included herein.

Several approaches are possible in an engineering sense for the detailed mechanics of performing the high pressure processing described herein and the detailed design of the equipment. The determining factors will most likely be the economic performance of each approach. In this section, we will describe several such general approaches, understanding thereby that obvious modifications and extensions of such approaches are frequently possible. We also disclose several such approaches with the assumption that different approaches will be preferred in different circumstances depending on the economics of the process and apparatus, the value of the recovered scrap, the nature and quantity of the pieces of pre-fragmented tires to be recycled, whether or not substantially intact tires are to be processed, and environmental impact concerns.

It is envisioned that the preferred method and apparatus for performing the present invention is to use high pressure water to detach the rubber from the metal cording material, leaving both in the effluent water stream for later separation, typically by means of a magnetic separator, etc. as described above. However, that is not the only method and apparatus for practicing the present invention. For certain purposes, it may be economically beneficial to separate the rubber from the steel fragments directly in the high pressure processing step. One method for performing this separation would be to utilize a processing chamber with sufficiently small openings therein to allow fluid and finely fragmented rubber to pass therethrough, but small enough to retain substantially all metal cording material of the size expected to be found in the pieces of pre-fragmented tires presented for high pressure processing. This mode of processing pieces of pre-fragmented tires would have the disadvantages of: 1) requiring the engineering complications of removing the steel from the processing chamber; and 2) requiring relatively longer processing time in order to produce finer crumb rubber (which could be potentially compensated to a certain measure by using higher processing pressures or a larger volume of water delivered onto the tire pieces per second, but not too high to risk significant fragmentation of the metal to enable the metal to enter into the effluent water stream after all). Even if some of the metal cording material is fragmented, there is less likelihood that rubber will remain attached to the small pieces of fragmented metal cording material after both have undergone sufficiently severe processing to cause both to exit from the processing chamber via relatively small openings therein.

It is common in performing mechanical fragmenting of tires to remove the region of the tire's inner circumference, the "bead" prior to mechanical fragmenting. The bead typically contains several thick bands of tough steel, having the potential to seriously damage mechanical cutting equipment. Therefore, "debeading" is frequently necessary prior to the typical operation of mechanical shredding or fragmenting of tires. However, this leaves the bead, and the rubber in the immediate vicinity thereof, for disposal along with the fragmented tires, currently done by means of landfill, incineration, etc. However, there is no essential difference in the use of high pressure water for the separation of metal cording material from rubber in pieces of pre-fragmented tires or in separating steel from rubber in the bead portion of tires. High pressure water has proven effective in separating rubber from bead to leave essentially clean steel bead, whether performed on the bead region of substantially intact tires or upon debeaded fragments extracted from tires prior to mechanical fragmenting. Thus, in the present invention, when reference is made to "shredded," "pre-shredded," "fragmented", "pre-fragmented," and the like in reference to tires, included therein is the portion of the tire containing the bead which may have been separately removed from the tire prior to processing by a conventional mechanical fragmenting apparatus.

Numerous embodiments are possible for the detailed engineering implementations in order to perform this basic task of separating metal from rubber in pieces of pre-fragmented tires. The determining factors will most likely be the economic performance of each approach as determined by factors such as: the capital cost of the equipment needed to carry out all processing steps; cost of operation, such as consumable materials, labor, utilities and overhead; the market value of the materials produced by various embodiments of the process (grain size of the crumb rubber, quality of metal, etc); and the economic and environmental benefits of disposing of pieces of pre-fragmented tires by alternative means. In this section, we will describe several such general approaches, understanding thereby that obvious modifications and extensions of such approaches are frequently possible.

Figure 1:
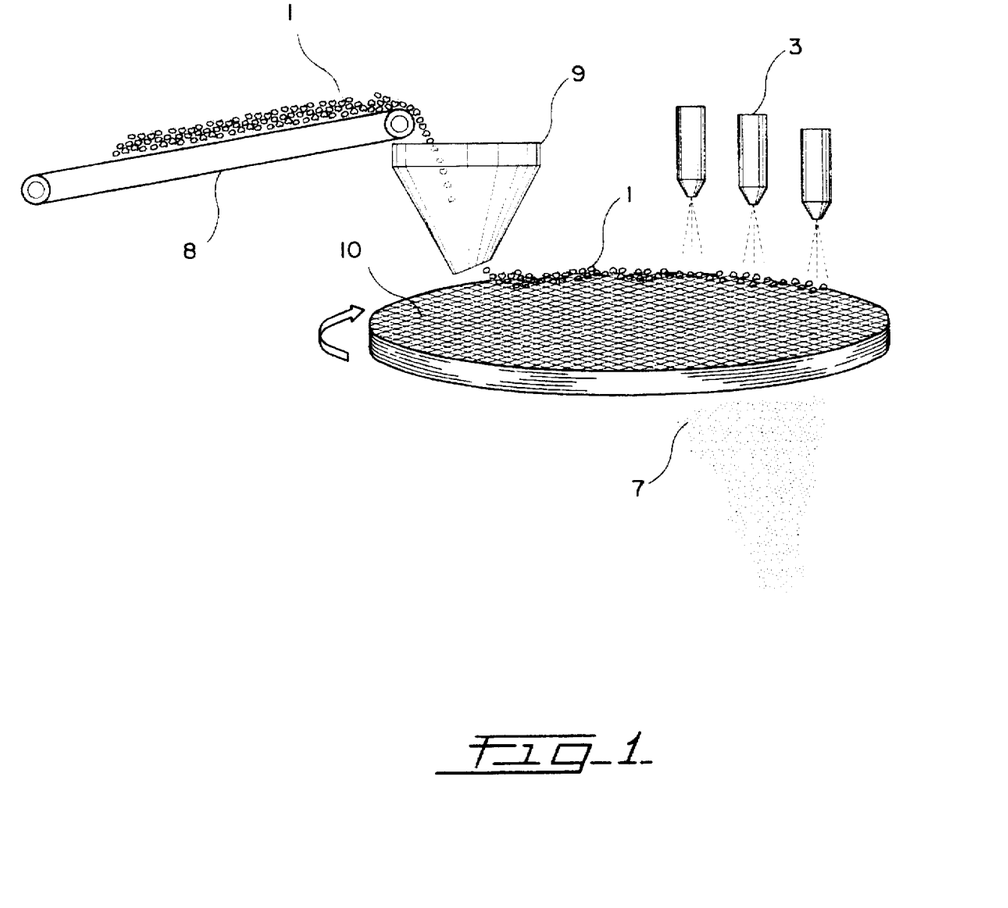
FIG. 1. A schematic drawing of one embodiment for carrying out a typical process of the present invention, showing a means for transporting pieces of pre-fragmented tires onto a rotating table onto which high pressure water is directed, and the creation of rubber and metal cording material as a simple mixture of detached or debonded constituents.

FIG. 1 shows a typical schematic diagram for the recycling of pieces of pre-fragmented scrap rubber tires using high pressure water. Pieces of pre-fragmented tire, 1, are typically transported (perhaps by means of conveyor, 8, and hopper, 9) onto a rotating table, 10, rotating in the sense of the arrow in FIG. 1. Rotation of the table, 10, brings the pieces of pre-fragmented tire, 1, into the path of the high pressure water jets, 3, for fragmentation. We show table, 10, in FIG. 1 having holes therein of suitable size and geometry to allow both rubber and steel fragments to pass therethrough as 7.

Figure 2:
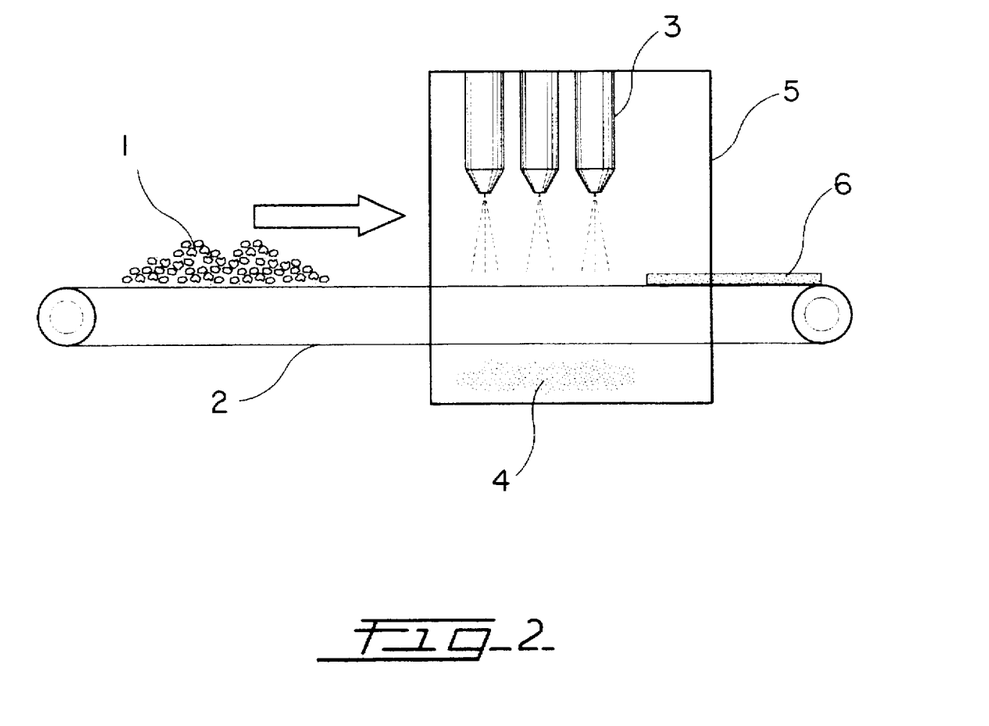
FIG. 2. A schematic drawing of another embodiment of the present invention, showing a means for transporting pieces of pre-fragmented tires to a processing chamber (shown in cut-away) into which high pressure water is directed, and the separation and recovery of rubber and metal cording material simultaneously with the high pressure processing.

FIG. 2 shows an alternative embodiment of the present invention. Pieces of pre-fragmented scrap tires, 1, are typically placed onto a means for transporting such pieces of pre-fragmented tires, 2, into the processing chamber, 5, (in the direction of the arrow in FIG. 2) in which the high pressure water jets, 3, are located. The application of high pressure water from the water jets, 3, typically results in the production of crumb rubber particles, 4. Typically, a conveyer belt, 2, would be used as shown in FIG. 2. However, in the processing chamber, the application of high pressure water may cause the pieces of pre-fragmented tires to move around and lessen the efficiency of rubber stripping. If such movement of the pieces of pre-fragmented tires, 1, is a concern, it would typically be feasible to include a restraining device for retaining the pieces on the transport belt, 2. For example, a grating, mesh, cover, cage or other retaining means may be employed.

We show in FIG. 2 an embodiment in which scrap metal cording material, 6, is separated from the fragmented rubber, 4. as part of the high pressure processing step. As noted above, this is one, but not the only, embodiment in which the present invention might be practiced. FIGS. 1 and 2 are not intended to be mutually exclusive in so far as variations discussed in conjunction with one figure are readily employed along with features of the other figure. That is, restraining and separating means described in connection with FIG. 2 could readily be employed in conjunction with the rotary table embodiment of FIG. 1, and alternatively for features noted in connection with FIG. 1 might be employed with the conveyer transport of FIG. 2. As stated above, if the movement of the pieces of pre-fragmented tires is a concern, retaining means may be employed.

Other embodiments may be used without departing from the spirit of the present invention. For example, it may be beneficial to have two conveyor belts with different sized holes therethrough for varying sizes of crumb rubber. Also, a metal cage may be used that is filled with pieces of pre-fragmented tires and put under the high pressure water stream to separate the rubber and metal cording material. If the holes in the cage are small enough, the crumb rubber will wash out of the cage with the effluent water and the metal cording material will remain in the cage. The cage can then be emptied and the metal cording therein is effectively separated from the crumb rubber.

In both FIGS. 1 and 2, the effluent fluid will typically pass through the transporting means (shown as 10 in FIG. 1 and 2 in FIG. 2) along with those components of the pieces of pre-fragmented tire, either rubber or a mixture of rubber and metal cording material.

In addition to rubber, metal cord and bead, pieces of pre-fragmented tires will typically contain fabric cord (typically nylon) most commonly originating from the sidewall region of the original tire. These fabric cords will normally be fragmented in substantially the manner as the rubber in the practice of the present invention. Thus, when we use the term "rubber" herein, it is understood that the term includes the fabric cording material (if any) typically present in pieces of pre-fragmented rubber tires.

We show in both FIGS. 1 and 2 the high pressure water being delivered through stationary nozzles. This is for convenience of drawing and is not an essential limitation of the present invention. The high pressure water could be delivered by any convenient number of nozzles, disposed in any convenient geometry above, below or beside the pieces of pre-fragmented tire. In FIGS. 1 and 2, we show a set of three nozzles, 3, directing water onto the pieces of pre-fragmented tires from one direction. It is not necessary for the practice of the present invention that several nozzles be used. In addition, rotary nozzles are common in the field of high pressure technology and have proven quite effective in the practice of the present invention. Rotary nozzles may be driven in their rotary motion by the reactive force of the exiting stream of fluid, or by an independent hydraulic, electric or other drive. In the practice of the present invention, it has been found to be preferred to use an independent drive to assure constant rotation speeds, substantially independent of variations in fluid flows. Robotic, computer controlled or other embodiments of non-stationary nozzles could also be used in connection with the present invention for delivery of high pressure water to the intended targets. In continuous operation, it is anticipated that the most economical approach will be to use a plurality of nozzles as illustrated in FIGS. 1 and 2, but this is not crucial for the effective practice of the present invention. A particular arrangement of nozzles, the type, configuration and placement thereof, is not believed to be essential to the practice of the present invention and will be determined by engineering experimentation by those having ordinary skill in the art, in order to make efficient use of high pressure water delivery.

The rotary apparatus of FIG. 1 is expected to make more efficient use of high pressure water than the linear conveyer means of FIG. 2. The pre-fragmented tires presented for high pressure processing will almost certainly have a variety of sizes, geometries, compositions, etc. depending on such factors as the location within the tire from which the particular fragment originated, the type of tire and its specific design, the detailed fragmentation history, and other typically uncontrolled and unknown variables. Therefore, optimal processing will vary from tire fragment to tire fragment. In order to achieve effective processing with a linear apparatus as in FIG. 2, the processing station (or stations, if a plurality of processing stations are used sequentially) must be sufficient to process the most difficult fragment. Otherwise, inadequately processed tire fragments will emerge from the apparatus and typically require separation and further processing. As a result, most tire fragments (not unusually resistant to processing) receive more exposure than necessary, making suboptimal use of the high pressure water delivered into the processing zone. The rotary apparatus of FIG. 1, on the other hand, will retain the tire fragments on rotary table, 10, and continually rotate them through the processing zone for as many times as necessary until complete destruction of the particular tire fragment occurs. Thus, the rotary apparatus of FIG. 1 is expected to be more efficient since it automatically compensates for unusually difficult-to-process fragments by exposing such fragments to as many processing steps as necessary to effect debonding and separation of the rubber from the metal. Overly generous exposures are, therefore, not necessary to effect complete destruction of every fragment, including unusually resistant fragments.

The technology for application of high pressure water, and the nozzles and delivery systems therefor, are well developed for pressurized-water cleaning and related or similar applications. Such nozzles and systems are well known in the field and will generally function adequately in practicing the present invention. In some instances, abrasive materials are added to the water stream for increased cleaning efficiency. This can be done also in the present case, typically increasing the fragmentation efficiency of the rubber-stripping process. Typically, two drawbacks will occur from the use of abrasive additives: 1) increased wear on nozzles or other components of the water-delivery system and 2) abrasive material will typically be mixed with the scrap material, not generally separable by magnetic separation. In some applications (as an asphalt additive or fuel for example) modest amounts of abrasive material mixed with the rubber will not be a serious concern. Likewise, increased rubber-stripping efficiency by the use of abrasive additives may, in some cases, more than compensate for the attendant drawbacks.

It is well known that high pressure fluid will effectively cut materials when directed thereon in a thin stream. However, cutting is not the goal of the present invention. The primary goal of the present invention is to fragment and separate rubber from the metal cording material (or bead) of pre-fragmented tires, leaving the metal portions detached from the rubber for easy separation from the rubber by any of a variety of magnetic or other means as described above. Therefore, thin streams of high pressure fluid are generally to be avoided in the practice of the present invention, but thin streams of water may be useful for fragmenting tires into pieces before being processed in accordance with the present invention.

A single processing parameter (such as pressure) is not adequate to describe the present process for removing rubber from pieces of pre-fragmented scrap tires. The effectiveness of this process depends typically upon four important factors: 1) the water pressure employed; 2) the area over which such pressurized water is dispersed ("impact area"); 3) the length of time the stream of pressurized water is directed onto any given region of the pieces of the pre-fragmented tires ("dwell time"); and 4) the flow rate of water through the nozzles. Other factors are also expected to contribute. Some of these additional factors include the angle of water impact on the pieces of pre-fragmented tire, and the presence or absence of abrasive additives in the water stream. For example, very high water pressures can be employed without fragmenting the metal cording material if the pressure is directed over a sufficiently large area. The pieces of pre-fragmented tires may also be soaked in a chemical solution of solvents or other chemicals to lower the strength of the bonds of the materials comprising the pieces. Other obvious compensating adjustments of parameters can be employed with simple testing to determine precise values.

It is found that water pressure of 2,000 pounds per square inch ("psi") is sufficient to strip rubber from the metal (or bead) of pieces of pre-fragmented scrap tires. However, the process is rather slow at this pressure. Pressures below 2,000 psi may be used, but we find such low pressures to be impractical in producing crumb rubber while detaching it from the metal cording material of the pieces of pre-fragmented tires. Thus, we use 2,000 psi as an approximate lower limit to the practical water pressures employed in the present invention. Water pressure from 6,000 psi to as high as 10,000 psi also serve to strip rubber from pieces of pre-fragmented scrap tires in the manner of the present invention. Higher pressures provide faster stripping of the rubber from the metal contained within the pieces of pre-fragmented tires. Higher pressures more quickly lead to complete stripping of the rubber from the metal cording material, although such stripping can be accomplished (albeit slower) at pressures of about 2,000 psi. High pressures (above 10,000 psi to around 20,000 or even 50,000 psi) may be used in the practice of the present invention, if suitable dwell time reduction or impact area enlargement is carried out to avoid unacceptable fragmentation of the metal cording material. We are aware of no effective upper pressure limit to the practice of the present invention so long as dwell time and impact area are adjusted for acceptable processing. However, the practicalities of obtaining very high pressures with present technology may place economic cost upper limits on the pressures for the practice of the present invention. Conversely, lower pressures may likewise be employed with a corresponding reduction in processing speed. The present technology for the production and delivery of high pressure water seems to make 2,000 psi to about 20,000 psi the practical range for the practice of the present invention, although both higher and lower pressures are not inherently excluded.

The above pressures may also be used, although with slower effect, in the processing of substantially intact tires to deliver crumb rubber and fragmented steel cord into the effluent water stream for later (typically magnetic) separation. However, the higher pressures tend to be more efficient in the processing of substantially intact tires since a greater mass of woven steel belts must typically be cleaned of rubber, dewoven and/or fragmented for delivery into the effluent stream along with the crumb rubber. Compensation in dwell time or volume of delivered water per second can compensate for certain effects of lower pressures. Such tradeoffs of processing parameters are readily determined by straight-forward testing.

A two-step (or multi-step) process may be also used for separation of rubber and cording material from pieces of pre-fragmented scrap tires. As noted above, the rotary apparatus of FIG. 1 automatically provides multi-step processing. Therefore, discrete steps as discussed herein, will typically refer to a linear processing configuration in the manner of FIG. 2 with a fixed and predetermined number of processing zones. Typically, the pieces of pre-fragmented tires, 1, will be first exposed to high pressure water in the range of approximately 3,500 psi. in a first processing zone. The purpose of this first step is to strip rubber from the pieces of pre-fragmented tire in the form of small particles. Typically, this first high pressure exposure will produce rather fine particles of rubber ("granulite") which would be generally useful for addition to asphalt or other tire derived products as typically practiced in the industry (perhaps after sizing, typically by passing the rubber through a screen with standard mesh). Before full penetration of the cording material occurs, while the cording material has substantial amounts of rubber still attached thereto, one embodiment would be to use the same nozzles for a second processing step and cause the pressure to be increased to a level (i.e., 6,000 psi to 20,000 psi) above the pressure of the first exposure to high pressure water.

In another embodiment, before full penetration of the cording material occurs, while the cording material has substantial amounts of rubber still attached thereto, the pieces of cording material having substantial amounts of rubber still attached thereto are moved to another location for further processing at a higher pressure. Subsequent processing at higher processing pressures would generally effect increased penetration of the steel belts or bead, resulting in cleaner steel products. Generalization to several processing stages would be a straight-forward extension, typically carried out by means of a linear processing configuration (FIG. 2), although a rotary processing configuration (FIG. 1) having a plurality of processing stations positioned so as to encounter tire fragments, 1, sequentially during their rotary traverse are not thereby excluded. Such differing processing stations in rotary or linear configurations would typically have one or more different processing conditions (pressures, water delivery volume, presence or absence of additives, size of processing zone, length of processing time, etc), to effect various processing conditions in sequence.

Following the first exposure to high pressure water, a second high pressure wash may be employed to separate the remaining rubber from the cording material producing (typically) larger chunks of rubber, and bare cording material. Typically, the rubber produced in this second wash will be larger in size and more suitable for tire derived fuel than for the manufacture of tire derived products. The configuration, number and pressure of nozzles is not critical to the present invention as long as adequate separation of substantially all the rubber from the cording material occurs. Typically, higher pressures (6,000 to 20,000 psi) will be employed in this second step to provide rapid penetration of the remaining pieces of rubber and cording material. Many other configurations of nozzles, numbers and pressures can be used as the economic and engineering practicalities of the particular process dictate. Clearly, more than two steps can be employed with various processing parameters in each step.

The water used in the process is typically collected, filtered to remove the rubber and other materials contained therein, and reused. When multi-step processing is used, it is generally convenient, although not necessary, to filter separately the effluent water from each step, thereby separating different sizes of crumb rubber product.

The two-step (or multi-step) process is not critical to the practice of the present invention. A single-step in which high pressure water is directed on the pieces of pre-fragmented tire for a suitable time period can equally effect a separation of the rubber from the cording or bead material. The economic value of the steel normally used in modem tires is, therefore, recovered. The rubber is likewise recovered and separated and washed away from the cording or bead material, ready for reuse (or further processing, if required) as tire derived fuel or in the manufacture of tire derived products.

The two-step (or multi-step) process described above has, as a primary function, the production of crumb rubber of different types by extracting it from the pieces of pre-fragmented tires using different pressures. However, a dual or multi-step process may also be useful when just a single pressure of water is employed. Moving the pieces of pre-fragmented tires from place to place (typically by a conveyer or rotating platform) is one practical means for directing water onto all portions of the pieces of pre-fragmented tires by using different placements and different geometries of nozzles at each location. One particular configuration employs two nozzle stages sequentially along a conveying means using relatively high pressures (i.e., in excess of 10,000 psi). The first stage serves to strip approximately 50% of the pieces of pre-fragmented tires. The second stage must have the nozzles positioned closer to the pieces of pre-fragmented tires to use the same processing pressure. Alternatively, higher pressures could be used for such a second stage but this would typically be less convenient as different pumps would typically be required.

We noted above certain references in the prior art in which tires are subject to cryogenic cooling, to chemical or thermal treatments, (or combinations thereof) prior to mechanically cutting such tires into fragments. Recognizing the drawbacks of mechanical cutting, such pre-cutting processing is intended to ease the operation of mechanical cutting of the tire by making the rubber brittle (in the case of cryogenic cooling), or softening and partially decomposing the rubber (in the case of chemical and/or thermal pre-treatment). Nothing in the present invention precludes such pretreatment by any of the aforesaid means. Just as such pre-treatments are intended to facilitate later processing by mechanical means, such pre-treatments could facilitate the subsequent high pressure processing according to the present invention. For economy of language, we denote by "pre-treatment" any such chemical, thermal, or cryogenic processing (or combination) which facilitates the subsequent separation of rubber from the metallic material of the tire or tire fragments, and/or the fragmentation of such rubber. It is intended that such pre-treatments are included in the practice of the present invention. Whether or not such are employed in conjunction with the high pressure processing of the present invention will be determined by the economics of the process including the costs of any such pre-treatment, balanced against any facilitated high pressure processing thereby brought about.

Having described the invention in detail, those skilled in the art will appreciate that, given the present disclosure, modifications may be made to the invention without departing from the spirit of the inventive concept herein described. Therefore, it is not intended that the scope of the invention be limited to the specific and preferred embodiments illustrated and described. Rather, it is intended that the scope of the invention be determined by the appended claims.

What is claimed is:

1. A continuous process for producing crumb rubber from a plurality of pieces of pre-fragmented tire and separating said crumb rubber from the metal cording material of said pieces of pre-fragmented tire, said process comprising the steps of:
    a') placing said pieces of pre-fragmented tire onto a rotatable surface; and,
    a") rotating said pieces of pre-fragmented tire through at least one processing zone wherein high pressure fluid is directed onto said pieces; and,
    a) directing at least one stream of fluid at a sufficiently high pressure onto said pieces of pre-fragmented tire in said at least one processing zone for a sufficient duration to fragment said rubber of said pieces into crumb rubber and to separate said crumb rubber from said cording material of said pieces by washing said crumb rubber away from said cording material and into the flow of effluent fluid, leaving said cording material substantially separate from said effluent fluid and said crumb rubber in said effluent fluid; and
    b) separating and recovering said crumb rubber from said effluent fluid.

2. A continuous process for producing crumb rubber from a plurality of pieces of pre-fragmented tire and separating said crumb rubber from the metal cording material of said pieces of pre-fragmented tire, said process comprising the steps of:
    a') placing said pieces of pre-fragmented tire onto a rotatable surface; and,
    a") transporting said pieces of pre-fragmented tire through at least one processing zone wherein high pressure fluid is directed onto said pieces; and,
    a) directing at least one stream of fluid at a sufficiently high pressure onto said pieces of pre-fragmented tire in said at least one processing zone for a sufficient duration to fragment said rubber of said pieces into crumb rubber and to detach said crumb rubber from said cording material of said pieces;
    b) washing said crumb rubber and said cording material into the flow of effluent fluid.

3. A process as in claim 1 or claim 2 wherein said step of directing said fluid onto said pieces of pre-fragmented tire is performed by at least one rotary nozzle.

4. A process as in claim 1 or claim 2 further comprising the step of adjusting the size of said stream of fluid to change the impact area on said pieces of pre-fragmented tire.

5. A process as in claim 1 or claim 2 further comprising the step of restraining said pieces of pre-fragmented tire while directing said fluid thereon.

6. A process as in claim 1 or claim 2 wherein said fluid has a pressure of at least approximately 2,000 pounds per square inch pressure.

7. A process as in claim 1 or claim 2 wherein said fluid has a pressure of at least approximately 10,000 pounds per square inch pressure.

8. A process as in claim 1 or claim 2 wherein said stream of fluid contains abrasive additives.

9. A process as in claim 1 or claim 2 wherein said stream of fluid is directed at different angles with respect to said pieces.

10. A process as in claim 1 or claim 2 further comprising the step of pre-treating said pieces of pre-fragmented tire preceding step (a) thereof.

11. A process as in claim 1 wherein said at least one processing zone has a plurality of holes through which said crumb rubber is washed away from said cording material and into said flow of said effluent fluid.

12. A process as in claim 1 further comprising the step of separating any of said metal cording material which is in said effluent fluid from said crumb rubber in said effluent fluid.

13. A process as in claim 2 further comprising the step of separating said metal cording material from said crumb rubber in said effluent fluid.

14. A process as in claim 12 or claim 13 wherein said separating step is performed by magnetic separation.

15. A process as in claim 1 or 2 wherein said rotatable surface transports each of said pieces of pre-fragmented tire through said at least one processing zone for a plurality of passages, sufficient for substantially complete processing of each of said pieces.

16. An apparatus for producing crumb rubber from a plurality of pieces of pre-fragmented tire and detaching said crumb rubber from the metal cording material of said pieces of pre-fragmented tire, said apparatus comprising:

a processing chamber to retain said pieces of pre-fragmented tire therein, said processing chamber having a plurality of holes through which crumb rubber and fragmented cording material exit following processing; and one or more fluid jets to direct at least one stream of fluid at a sufficiently high pressure onto said pieces of pre-fragmented tire in said processing chamber for a sufficient duration to fragment said rubber of said pieces into crumb rubber and to detach said crumb rubber from said cording material of said pieces, and washing said crumb rubber and said cording material into the flow of effluent fluid, leaving said cording material substantially detached from said crumb rubber.

17. The apparatus of claim 16 wherein said processing chamber includes a rotatable platform having a plurality of holes through which crumb rubber exits following processing.

18. The apparatus of claim 17 wherein said rotatable platform moves said pieces of pre-fragmented tire to expose said pieces of pre-fragmented tire to the fluid streams from said fluid jets to obtain substantially complete processing of each of said pieces of pre-fragmented tire.

19. The apparatus of claim 16 further comprising a transporter to continuously transport said pieces of pre-fragmented tire into said processing chamber, thereby enabling continuous processing of pieces of pre-fragmented tire.

20. The apparatus of claim 19 wherein said transporter is a conveyor, hopper or auger.

21. The apparatus of claim 16 further comprising a separator for separating and recovering said crumb rubber from said cording material and said effluent fluid.

22. An apparatus for producing crumb rubber from a plurality of pieces of pre-fragmented tire and separating said crumb rubber from the metal cording material of said pieces of pre-fragmented tire, said apparatus comprising:

a processing chamber to retain said pieces of pre-fragmented tire therein, said processing chamber having a plurality of holes through which crumb rubber exits following processing; and one or more fluid jets to direct at least one stream of fluid at a sufficiently high pressure onto said pieces of pre-fragmented tire in said processing chamber for a sufficient duration to fragment said rubber of said pieces into crumb rubber and to separate said crumb rubber from said cording material of said pieces by washing said crumb rubber away from said cording material and into the flow of effluent fluid, leaving said cording material substantially separate from said effluent fluid and said crumb rubber in said effluent fluid.

23. The apparatus of claim 22 wherein said processing chamber includes a rotatable platform having a plurality of holes through which crumb rubber exits following processing.

24. The apparatus of claim 23 wherein said rotatable platform moves said pieces of pre-fragmented tire to expose said pieces of pre-fragmented tire to the fluid streams from said fluid jets to obtain substantially complete processing of each of said pieces of pre-fragmented tire.

25. The apparatus of claim 22 further comprising a transporter to continuously transport said pieces of pre-fragmented tire into said processing chamber, thereby enabling continuous processing of pieces of pre-fragmented tire.

26. The apparatus of claim 25 wherein said transporter is a conveyor, hopper or auger.

27. The apparatus of claim 22 further comprising a separator for separating and recovering said crumb rubber from said effluent fluid.

* * * * *